United States Patent
Coates

[19]

[11] Patent Number: 5,921,021
[45] Date of Patent: Jul. 13, 1999

[54] LAWN BORDER AND EDGING DEVICE

[76] Inventor: Carl Coates, 1 Coates Dr., Corydon, Iowa 50060

[21] Appl. No.: 08/927,829

[22] Filed: Sep. 11, 1997

[51] Int. Cl.$^6$ ........................................................ A01G 1/08
[52] U.S. Cl. ................................................ 47/33; 52/102
[58] Field of Search ................................. 47/33, 24, 25, 47/32; 52/102

[56] References Cited

U.S. PATENT DOCUMENTS

| | | |
|---|---|---|
| 352,146 | 11/1886 | Oungst . |
| 397,732 | 2/1889 | Landis . |
| 1,015,584 | 1/1912 | Powell . |
| 2,877,600 | 3/1959 | Slate . |
| 3,415,013 | 12/1968 | Galbraith . |
| 3,537,687 | 11/1970 | Adelman . |
| 4,905,409 | 3/1990 | Cole ............................................. 47/33 |
| 4,976,063 | 12/1990 | Young ........................................... 47/33 |
| 5,119,587 | 6/1992 | Waltz ........................................... 47/33 |
| 5,257,451 | 11/1993 | Lilley ........................................... 47/33 |
| 5,675,930 | 10/1997 | Cooper ......................................... 47/33 |

*Primary Examiner*—Jack W. Lavinder
*Assistant Examiner*—Yvonne R. Abbott
*Attorney, Agent, or Firm*—Zarley, McKee, Thomte, Voorhees & Sease

[57] ABSTRACT

The lawn border and edging member of this invention has an elongated vertical wall member which has opposite vertical side surfaces, first and second opposite ends, and elongated top and bottom surfaces. A flat plate member is secured to the bottom surface of the wall member and has a width extending outwardly from each side of the wall member to maintain the wall member in a vertical position. The outer ends of the plate member extend longitudinally outwardly beyond each end of the wall member. The plate member has an offset portion on its bottom surface to receive an end extension portion of another juxtapositioned member having an end extension portion and an elongated horizontal slot to receive an end extension portion of another juxtapositioned member having an end extension portion. The wall member has connecting means on its opposite ends for pivotal attachment to the ends of similar wall members. The connecting means includes a tongue element on one of the ends and a size compatible horizontal notch on the other of the ends. A vertical hinge pin having a lower end, and a length greater than the height of the wall member extends through the overlapping tongue elements and horizontal notches. The hinge pins penetrate a ground surface upon which the member is mounted. The protruding ends of the plate members are in the shape of a semi-circle. Except for the hinge pins, the member described heretofore can be comprised of a single piece of molded material.

26 Claims, 4 Drawing Sheets

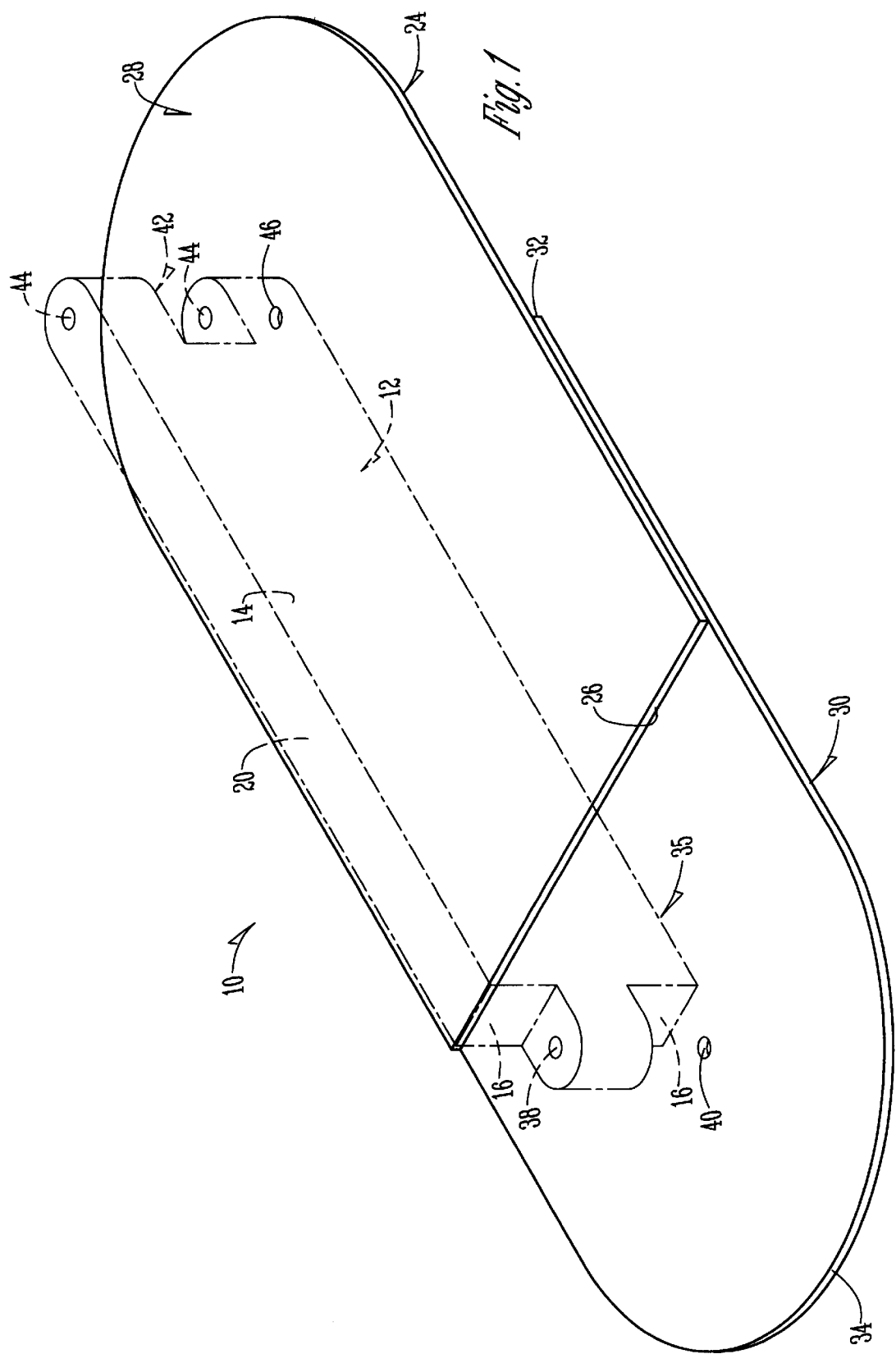

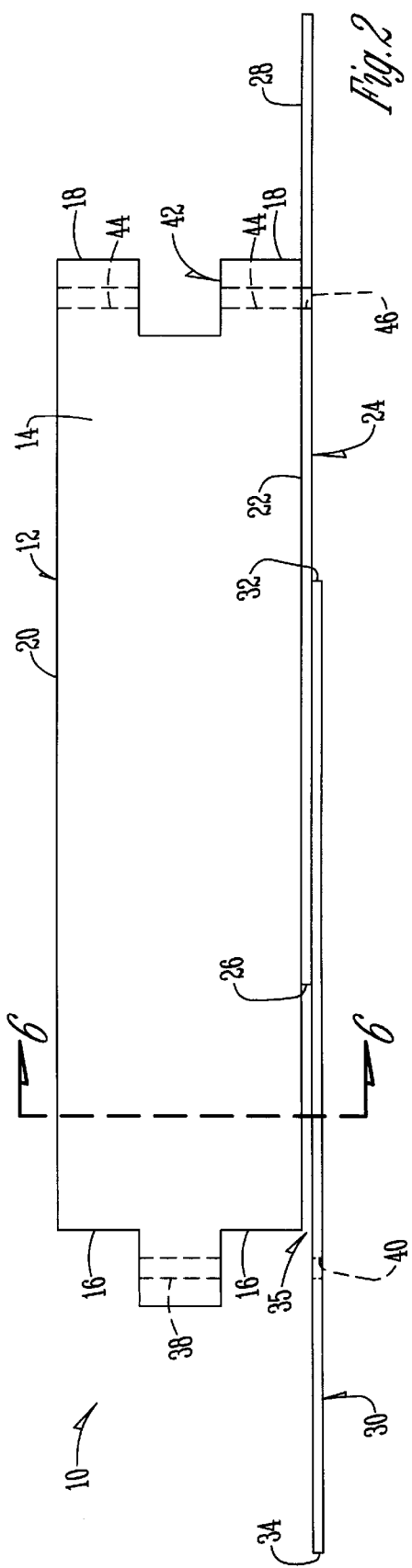
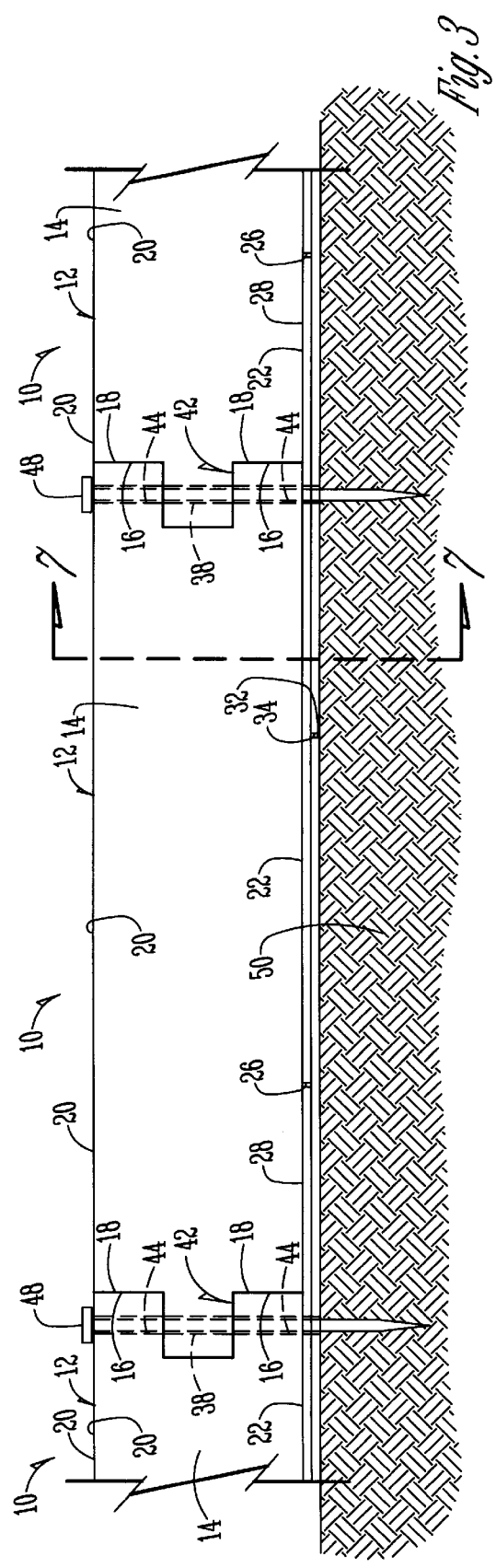

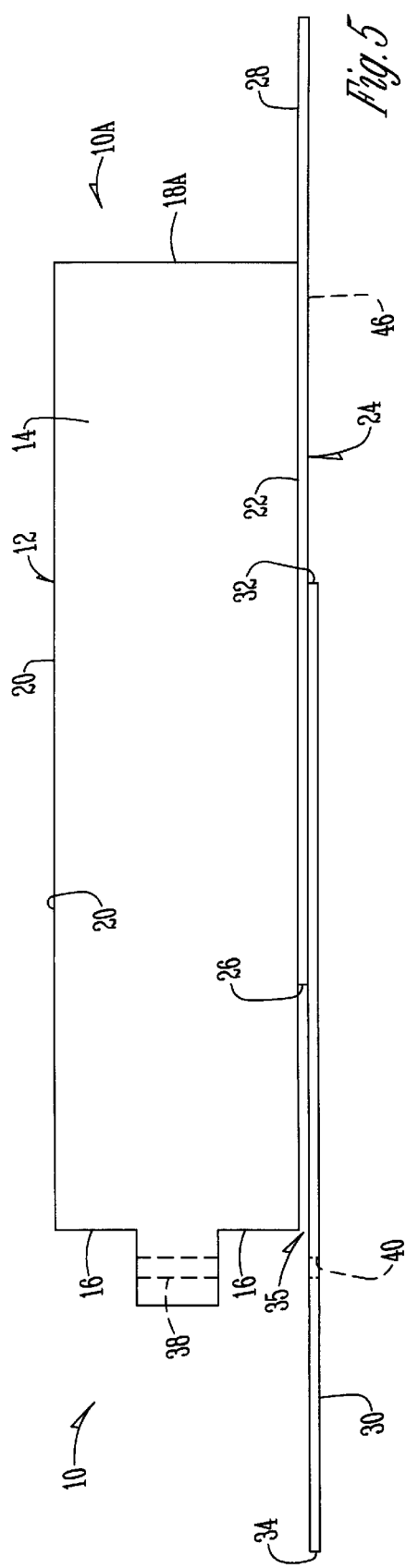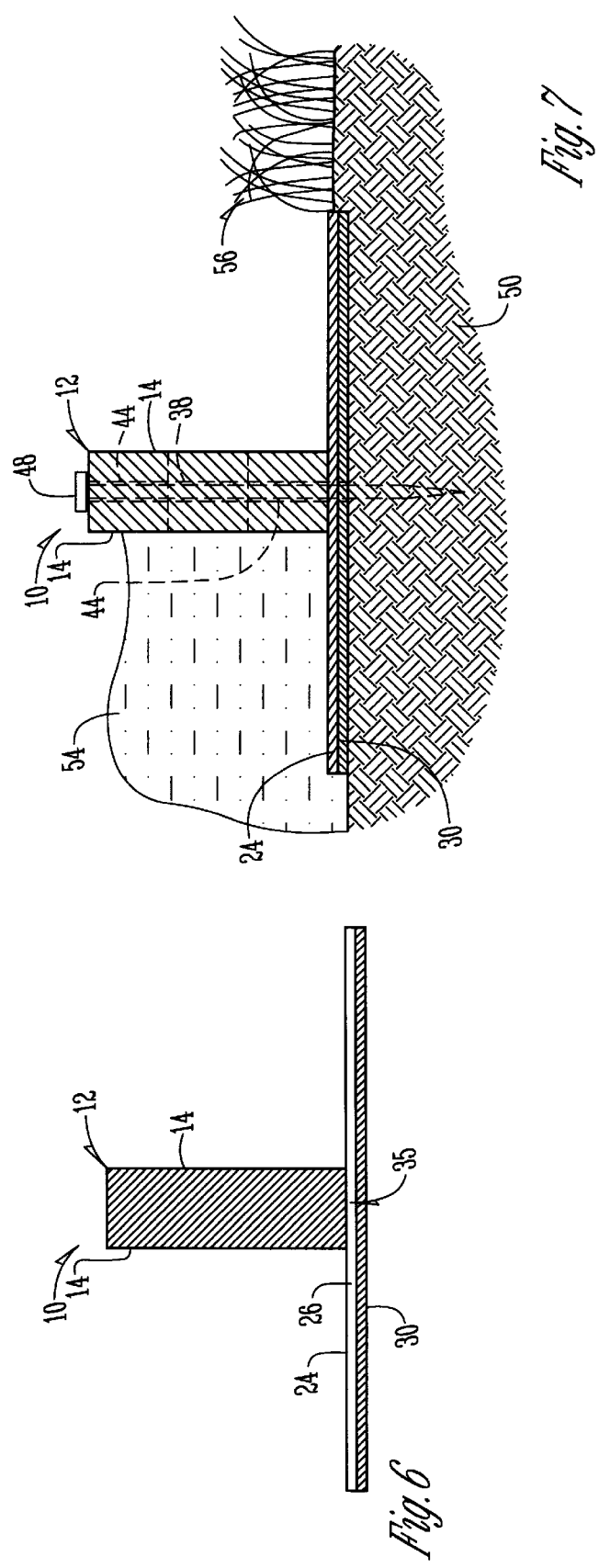

LAWN BORDER AND EDGING DEVICE

BACKGROUND OF THE INVENTION

Typical lawn edging and border devices to separate a lawn, drive, or the like from gardens, trees or planting areas have long been in use. Examples thereof are shown in the following U.S. Pat. Nos. 3,415,013 and 4,976,063. Among their shortcomings are that the wall portion thereof is not stable and can be deflected laterally; they are not easily installed and cannot be adapted readily to different shapes, and they allow grass and weeds to grow adjacent the wall portion.

Therefore, a principal object of this invention is to provide a lawn border and edging device which is stable and cannot be laterally deflected; that can be easily installed and can be adapted easily to different shapes; and which will allow grass and weeds growing adjacent the wall portion to be easily trimmed.

These and other objects will be apparent to those skilled in the art.

SUMMARY OF THE INVENTION

The lawn border and edging device of this invention has an elongated vertical wall member which has opposite vertical side surfaces, first and second opposite ends, and elongated top and bottom surfaces. A flat plate member is secured to the bottom surface of the wall member and has a width extending outwardly from each side of the wall member to maintain the wall member in a vertical position. The outer ends of the plate member extend longitudinally outwardly beyond each end of the wall member. The plate member has an offset portion on its bottom surface to receive an end extension portion of another juxtapositioned device having an end extension portion and an elongated horizontal slot to receive an end extension portion of another juxtapositioned device having an end extension portion.

The wall member has connecting means on its opposite ends for pivotal attachment to the ends of similar wall members. The connecting means includes a tongue element on one of the ends and a size compatible horizontal notch on the other of the ends. A vertical hinge pin having a lower end, and a length greater than the height of the wall member extends through the overlapping tongue elements and horizontal notches. The hinge pins penetrate a ground surface upon which the device is mounted. The protruding ends of the plate members are in the shape of a semi-circle. Except for the hinge pins, the device described heretofore can be comprised of a single piece of molded material.

BRIEF DESCRIPTION OF THE DRAWINGS

FIG. 1 is a perspective view of the superimposed end overlapping plate members of this invention with the wall member being shown therein in dotted lines;

FIG. 2 is a side elevational view of the device of this invention;

FIG. 3 is an elevational view similar to that of FIG. 2 but shows several of the devices of this invention interconnected together;

FIG. 5 is an alternate form of the invention;

FIG. 6 is a sectional view taken on line 6—6 of FIG. 2; and

FIG. 7 is a sectional view taken on line 7—7 of FIG. 3.

DESCRIPTION OF THE PREFERRED EMBODIMENT

Figure 4:
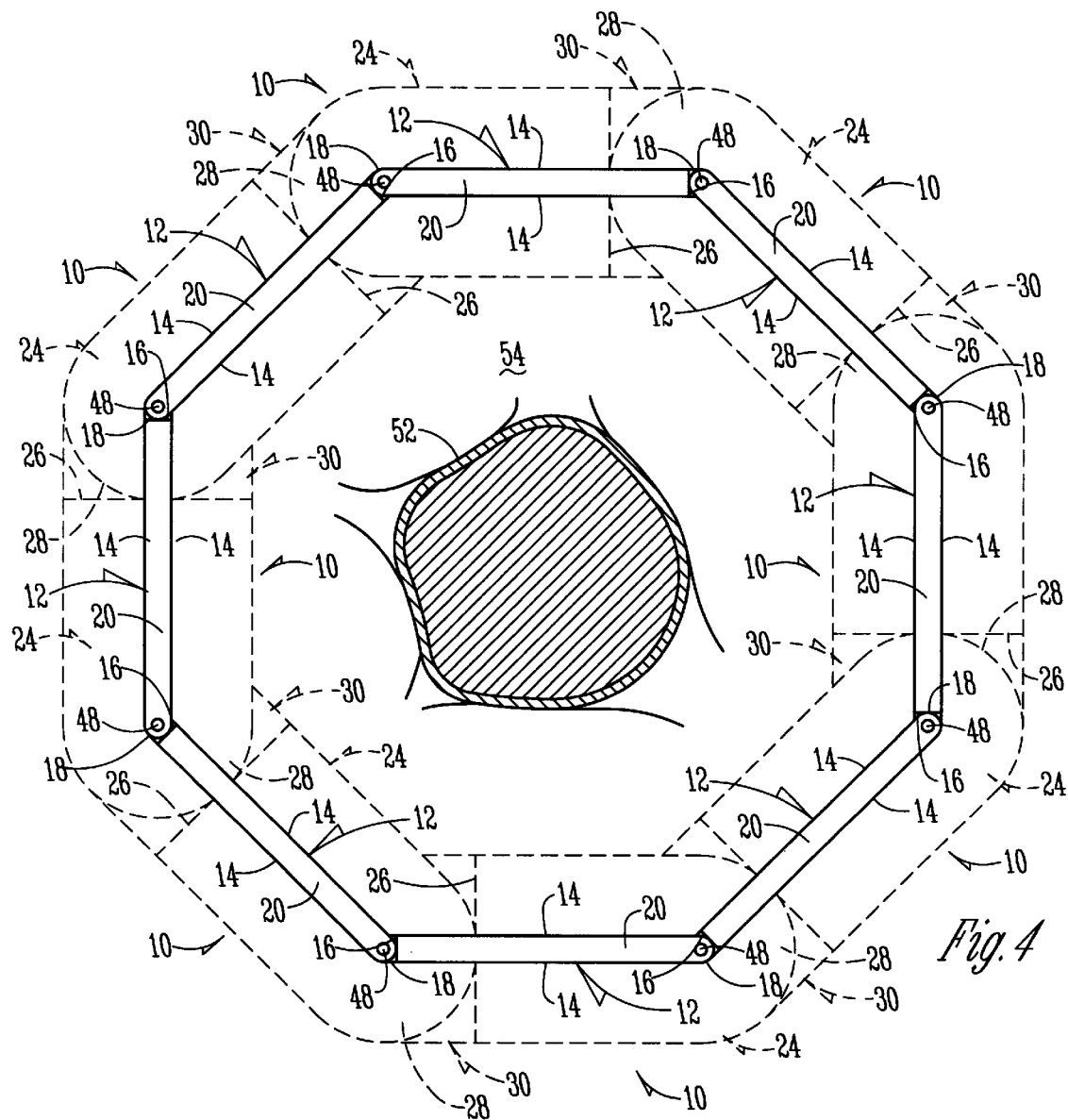
FIG. 4 is a top plan view of the devices in FIG. 7 arranged in a continuous hexagonal orientation around a tree.

With reference to FIG. 2, a border element 10 has a wall member 12 of elongated construction. Wall member 12 has side surfaces 14, first and second ends 16 and 18 respectively, and top and bottom surfaces 20 and 22.

A first plate member 24 (FIG. 2) has an inner end 26 and an outer end 28. It is secured to the bottom surface 22 of wall member 12. The end 28 extends outwardly beyond the second end 18 of the wall member.

A second plate member 30, identical in shape to the first plate member 24, has an inner end 32 and an outer end 34. Plate member 30 (FIG. 2) overlaps plate member 24 and is secured thereto as shown in FIG. 2 in any convenient manner if the entire device is not of integral construction. Again, with reference to FIG. 2, the outer end 34 of plate member 30 extends outwardly beyond the end 16 of wall 12, thereby creating a space 35 between the upper surface of plate 30 and the bottom surface 22 of the wall member 12. Space 35 is sufficient to receive an end 28 of a plate member 24 secured to a similar device as will be discussed hereafter.

A tongue 36 is formed on the end 16 of wall 12 and has a vertical bore 38 extending therethrough and is in alignment with aperture 40 in plate member 30.

A horizontal open notch 42 is formed on the end 18 of wall 12 and is complimentary in shape to the tongue 36 on the other end of wall 12 so that when the tongue 36 of an identical member 10 is placed in juxtaposition with the device in FIG. 2, tongue 36 thereof can be slidably received within the notch 42. A vertical bore 44 extends through the wall 12 above and below notch 42 and is in axial alignment with aperture 46 in plate 24. Hinge pins 48 (FIG. 7) have a length greater than the height of wall 12 extend through the registering bores 38 and 44, and apertures 40 and 46, as described above to pivotally secure juxtapositioned members 10 in pivotal relationship to each other.

In operation, the members 10 are secured together by the pins 48 as best shown in FIGS. 3 and 4. The hinge pins 48 extend into the ground 50 to stabilize the members 10. A typical orientation of assembled members 10 is shown in FIG. 4 as they extend around tree 52. The presence of one end 28 of the plate 24 located within the open slot 35 of the next adjacent member 10 facilitates the stability of the joined members and aids in the assembly of the devices. The arcuate outer ends of the plates 24 and 30 permits them be pivotally adjusted from a longitudinal aligned position to a position at right angles to each other.

An alternate form of the invention is shown in FIG. 5 wherein a border element 10A has one end 18A which is of square construction. Such an element is useful when the elements 10 and 10A are secured together in a longitudinal manner wherein the ends thereof are not all joined together as shown in FIG. 4. Element 10A would, for example, be at one end of a series of members 10 disposed in a non-enclosed linear configuration.

With reference to FIG. 5, it is shown how bark or the like 54 can be placed on one side of the wall 12 with long grass 56 appearing on the other side thereof. Weeds and the like will not be permitted to grow immediately adjacent the wall 12 by reason of the plates 24 and 30.

It is therefore seen that this device can be easily assembled and placed in a variety of positions in a very stable condition whereupon all the objectives of this invention will be accomplished.

What is claimed is:

1. A lawn border and edging device, comprising, an elongated vertical wall member with opposite vertical side surfaces, first and second opposite ends, and elongated top and bottom surfaces, a flat plate on the bottom surface of said wall member and having opposite ends extending longitudinally beyond the opposite ends of said wall member to create opposite end extension portions, said flat plate extending laterally outwardly from each side of the wall member, and connecting means for hingedly connecting the ends of said wall member to similar devices to create an elongated border assembly.

2. The device of claim 1 wherein said connecting means includes a vertical hinge pin extending therethrough and through the center of said end extension portions.

3. The device of claim 2 wherein the length of said hinge pin is greater than the height of said wall to permit a lower end of said hinge pin to penetrate an earthen surface upon which said device is mounted.

4. The device of claim 1 wherein a plurality of said devices are pivotally secured together by vertical hinge pins extending through registering overlapping hinge elements on the ends of said wall members in juxtaposition.

5. The device of claim 1 wherein said wall member and said flat plate are comprised of a single piece of material.

6. The device of claim 1 wherein said plate has an offset portion on its bottom surface to receive an end extension portion of another juxtapositioned device.

7. The device of claim 1 wherein said plate has an elongated horizontal slot to receive an end extension portion of another juxtapositioned device.

8. The device of claim 1 wherein said wall member has connecting means on said first and second ends thereof for pivotal attachment to the ends of similar wall members.

9. The device of claim 1 where said connecting means includes a tongue element on one of said ends and a size compatible horizontal notch on the other of said ends.

10. The device of claim 1 wherein said connecting means further includes a vertical hinge pin having a lower end, and a length greater than the height of said wall member to permit said lower end to penetrate an earthen surface upon which said device is mounted.

11. The device of claim 1 wherein said end extension portions have an outer semi-circular edge.

12. A lawn border and edging device, comprising, an elongated vertical wall member having opposite vertical side surfaces, first and second opposite ends, and elongated top and bottom surfaces, a first flat plate member secured to said bottom surface and having inner and outer ends, and a width extending outwardly from each side of said wall member to maintain said wall member in a vertical position, the outer end of said first plate member extending longitudinally outwardly beyond the second end of said wall member, the inner end of said first plate member terminating inwardly from the second end of said wall member, a second flat plate member having inner and outer ends, and a width extending outwardly from each side of said wall member, said second flat plate member partially overlapping said first flat plate member and being secured thereto, and having a first end extending longitudinally outwardly from beyond the first end of said wall member, the inner end of said second plate member terminating inwardly from the first end of said wall member to create an elongated space between said second plate member and the bottom of said wall member to receive the outer end of a similar lawn border and edging device.

13. The device of claim 12 wherein said wall member has connecting means on said first and second ends thereof for pivotal attachment to the ends of similar wall members.

14. The device of claim 12 where said connecting means includes a tongue element on one of said ends and a size compatible horizontal notch on the other of said ends.

15. The device of claim 14 wherein vertical bores extend through said tongue element and said horizontal notch in vertical alignment with apertures in said plate members to receive vertically disposed hinge members.

16. The device of claim 12 wherein said connecting means further includes a vertical hinge pin having a lower end, and a length greater than the height of said wall member to permit said lower end to penetrate an earthen surface upon which said device is mounted.

17. The device of claim 12 wherein the ends of said plate members extending beyond said wall member are horizontally arcuately shaped.

18. The device of claim 12 wherein the ends of said plate members extending beyond said wall member are horizontally circularly shaped.

19. The device of claim 18 wherein said connecting means further includes a vertical hinge pin having a lower end, and a length greater than the height of said wall member to permit said lower end to penetrate an earthen surface upon which said device is mounted, and wherein the ends of said plate members extending beyond said wall member are horizontally circularly shaped, and wherein said hinge pins extend through the centers of the horizontal circularly shaped ends of said plate members which extend beyond said wall member.

20. The device of claim 12 wherein a plurality of said devices are pivotally secured together by vertical hinge pins extending through registering overlapping hinge elements on the ends of said wall members in juxtaposition.

21. The device of claim 20 wherein said hinge elements are interconnected tongue and notch assemblies on adjacent ends of said vertical wall members.

22. The device of claim 21 wherein said tongue and notch assembly are interconnected by vertical hinge pins that extend through said plate members and said tongue and notch assemblies.

23. The device of claim 12 wherein said wall member and said plate members are comprised of a single piece of material.

24. The device of claim 12 wherein said wall member and said plate members are comprised of a single piece of molded material.

25. The device of claim 12 wherein said plate members are of the same identical size and shape.

26. The device of claim 12 wherein one end of said wall member is square with a vertical edge.

* * * * *